UNITED STATES PATENT OFFICE.

ARTHUR MARKS, OF KNOCK, BELFAST, IRELAND, ASSIGNOR TO HIMSELF AND HARLAND AND WOLFF LIMITED, OF BELFAST, IRELAND.

CONCRETE.

1,309,296.      Specification of Letters Patent.      Patented July 8, 1919.

No Drawing.      Application filed January 4, 1919. Serial No. 269,670.

*To all whom it may concern:*

Be it known that I, ARTHUR MARKS, a subject of the King of Great Britain, residing at Knock, Belfast, Ireland, have invented new and useful Improvements in Concrete, of which the following is a specification.

This invention relates to light forms of concrete, some of which resemble and have the properties of wood.

It is found that light porous aggregates, such as saw dust and cork, which are used in making concretes, become water-logged, and, when used in large percentages, prevent the binding of any Portland cement used in their manufacture, and in such concretes cements consisting of magnesium chlorid and calcined magnesia are often used to bring about binding, but it is found that these have corrosive properties.

According to this invention Portland cement and saw dust in the proportion by weight of two parts of cement to one part of wood are mixed together, and the mixture is made damp by the addition of a solution of sodium silicate containing one part by volume of sodium silicate to three parts of water. The damp mixture is then treated with a solution of calcium chlorid of a 10% to 20% strength; the amount of calcium chlorid is such that the mixture contains a slight excess of sodium silicate. Instead of using a calcium chlorid solution, hydrochloric acid or other easily ionized acid may be used, in which cases a filler is used having an excess of lime, or lime is added as a filler.

I claim—

1. Concrete consisting of Portland cement, saw dust, a quantity of a solution of sodium silicate sufficient to render damp the mixture of Portland cement and saw dust and such a quantity of a solution of calcium chlorid that the mixture contains a slight excess of sodium silicate.

2. Concrete consisting of two parts by weight of Portland cement, one part by weight of saw dust, a quantity of a solution of sodium silicate sufficient to render damp the mixture of Portland cement and saw dust and such a quantity of a solution of calcium chlorid that the mixture contains a slight excess of sodium silicate.

3. Concrete consisting of Portland cement, saw dust, a quantity of a solution of sodium silicate sufficient to render damp the mixture of Portland cement and saw dust and such a quantity of an easily ionized acid that the mixture contains a slight excess of sodium silicate.

In testimony that I claim the foregoing as my invention, I have signed my name this 30th day of November, 1918.

ARTHUR MARKS.

Copies of this patent may be obtained for five cents each, by addressing the "Commissioner of Patents, Washington. D. C."